US009830571B2

(12) United States Patent
Betancourt

(10) Patent No.: US 9,830,571 B2
(45) Date of Patent: Nov. 28, 2017

(54) SYSTEM AND METHOD FOR COORDINATING TRANSPORT OF CARGO

(75) Inventor: Ernest Blas Betancourt, Lascassas, TN (US)

(73) Assignee: Epona LLC, Franklin, TN (US)

( * ) Notice: Subject to any disclaimer, the term of this patent is extended or adjusted under 35 U.S.C. 154(b) by 1077 days.

(21) Appl. No.: 12/888,831

(22) Filed: Sep. 23, 2010

(65) Prior Publication Data
US 2012/0078743 A1 Mar. 29, 2012

(51) Int. Cl.
G06Q 30/00 (2012.01)
G06Q 10/08 (2012.01)
G06Q 30/08 (2012.01)

(52) U.S. Cl.
CPC ..... *G06Q 10/083* (2013.01); *G06Q 10/08355* (2013.01); *G06Q 30/08* (2013.01)

(58) Field of Classification Search
CPC .......................................... G06Q 30/00–30/08
USPC ................................ 705/26.1–27.2
See application file for complete search history.

(56) References Cited

U.S. PATENT DOCUMENTS

| | | |
|---|---|---|
| 4,250,550 A | 2/1981 | Fleischer |
| 4,490,798 A | 12/1984 | Franks et al. |
| 4,658,371 A | 4/1987 | Walsh et al. |
| 4,804,937 A | 2/1989 | Barbiaux et al. |
| 5,400,018 A | 3/1995 | Scholl et al. |
| 5,694,322 A | 12/1997 | Westerlage et al. |
| 5,700,999 A | 12/1997 | Streicher et al. |
| 5,724,243 A | 3/1998 | Westerlage et al. |
| 5,819,234 A | 10/1998 | Slavin et al. |
| 5,862,222 A | 1/1999 | Gunnarsson |
| 5,913,180 A | 6/1999 | Ryan |
| 5,923,572 A | 7/1999 | Pollock |
| 5,970,481 A | 10/1999 | Westerlage et al. |
| 5,974,356 A | 10/1999 | Doyle et al. |
| 5,987,377 A | 11/1999 | Westerlage et al. |
| 6,045,040 A | 4/2000 | Streicher et al. |

(Continued)

FOREIGN PATENT DOCUMENTS

WO 95/21506 A2 8/1995

OTHER PUBLICATIONS

Office action for related U.S. Appl. No. 11/678,110 dated May 31, 2011.

(Continued)

*Primary Examiner* — Michael Misiaszek
(74) *Attorney, Agent, or Firm* — Banner & Witcoff, Ltd.

(57) ABSTRACT

A marketplace may be provided to allow posting of transport jobs and bidding on various aspects of the transport jobs. For example, a carrier may bid on transportation of cargo while fuel providers may bid on the fuel provision. In some arrangements, the carriers may solicit bids for a fueling portion of a transport job that they wish to bid on, have already bid on or have won. Transport may correspond to the physical conveyance of cargo from origin to destination and may include vehicle costs, driver costs, carrier fees and the like. Fuel costs may refer to the cost of fuel and/or pumping fees. A system may automatically generate suggested routes for transport and determine a projected amount of fuel needed for the trip. Additionally, the system may automatically identify potential or projected refueling locations and select refueling stations or providers based thereon.

15 Claims, 9 Drawing Sheets

(56) References Cited

U.S. PATENT DOCUMENTS

| | | |
|---|---|---|
| 6,072,402 A | 6/2000 | Kniffin et al. |
| 6,116,505 A | 9/2000 | Withrow |
| 6,124,810 A | 9/2000 | Segal et al. |
| 6,128,551 A | 10/2000 | Davis et al. |
| 6,154,658 A | 11/2000 | Caci |
| 6,195,019 B1 | 2/2001 | Nagura |
| 6,213,393 B1 | 4/2001 | Streicher et al. |
| 6,233,563 B1 | 5/2001 | Jefferson et al. |
| 6,338,008 B1 | 1/2002 | Kohut et al. |
| 6,343,241 B1 | 1/2002 | Kohut et al. |
| 6,370,454 B1 | 4/2002 | Moore |
| 6,389,337 B1 | 5/2002 | Kolls |
| 6,402,030 B1 | 6/2002 | Summers et al. |
| 6,441,732 B1 | 8/2002 | Laitsaari et al. |
| 6,554,183 B1 | 4/2003 | Sticha et al. |
| 6,574,603 B1 | 6/2003 | Dickson et al. |
| 6,615,186 B1 | 9/2003 | Kolls |
| 6,616,036 B2 | 9/2003 | Streicher et al. |
| 6,738,697 B2 | 5/2004 | Breed |
| 6,747,365 B2 | 6/2004 | Reinold et al. |
| 6,856,820 B1 | 2/2005 | Kolls |
| 6,895,310 B1 | 5/2005 | Kolls |
| 6,899,151 B1 | 5/2005 | Latka et al. |
| 6,965,872 B1 | 11/2005 | Grdina |
| 6,991,160 B2 | 1/2006 | Demere |
| 7,379,920 B2 | 5/2008 | Leung et al. |
| 7,481,366 B2 | 1/2009 | Demere |
| 7,604,169 B2 | 10/2009 | Demere |
| 7,668,644 B2 | 2/2010 | Tengler et al. |
| 7,729,998 B2 | 6/2010 | Dickman |
| 8,489,326 B1 * | 7/2013 | Na et al. ............. 701/426 |
| 2002/0020742 A1 | 2/2002 | Streicher et al. |
| 2002/0065787 A1 | 5/2002 | Evers et al. |
| 2002/0072963 A1 | 6/2002 | Jonge |
| 2002/0186144 A1 | 12/2002 | Meunier |
| 2003/0083060 A1 | 5/2003 | Menendez |
| 2003/0107548 A1 | 6/2003 | Eun et al. |
| 2003/0120608 A1 | 6/2003 | Pereyra |
| 2003/0167345 A1 | 9/2003 | Knight et al. |
| 2003/0195676 A1 | 10/2003 | Kelly et al. |
| 2004/0140354 A1 | 7/2004 | Demere |
| 2004/0200897 A1 | 10/2004 | Demere |
| 2004/0215575 A1 | 10/2004 | Garrity |
| 2004/0243285 A1 | 12/2004 | Gounder |
| 2005/0102074 A1 | 5/2005 | Kolls |
| 2005/0125117 A1 | 6/2005 | Breed |
| 2005/0177859 A1 | 8/2005 | Valentino, III et al. |
| 2005/0184155 A1 | 8/2005 | Pinkus |
| 2005/0234616 A1 | 10/2005 | Oliver et al. |
| 2005/0248444 A1 | 11/2005 | Joao |
| 2005/0273218 A1 | 12/2005 | Breed et al. |
| 2006/0012479 A1 | 1/2006 | Ezra |
| 2006/0018625 A1 | 1/2006 | Johnson et al. |
| 2006/0022842 A1 | 2/2006 | Zoladek et al. |
| 2006/0052980 A1 | 3/2006 | LaFollette et al. |
| 2006/0108413 A1 | 5/2006 | Demere |
| 2006/0218056 A1 * | 9/2006 | Dickman ............. 705/28 |
| 2007/0050279 A1 * | 3/2007 | Huang et al. ............. 705/37 |
| 2007/0273763 A1 | 11/2007 | Smith |
| 2008/0091544 A1 | 4/2008 | Linlor |
| 2008/0208701 A1 | 8/2008 | Betancourt et al. |
| 2008/0214173 A1 | 9/2008 | Preiss et al. |
| 2010/0106641 A1 | 4/2010 | Chassin et al. |

OTHER PUBLICATIONS

U.S. Office Action dated Dec. 23, 2010, corresponding U.S. Appl. No. 11/678,110.

U.S. Office Action dated May 31, 2011, corresponding U.S. Appl. No. 11/678,110.

U.S. Office Action dated Dec. 21, 2011, corresponding U.S. Appl. No. 12/713,828.

U.S. Office Action dated Mar. 2, 2011, corresponding U.S. Appl. No. 11/678,125.

International Search Report & Written Opinion dated of Feb. 21, 2012, for International Application No. PCT/US2011/051210 (14 pages total).

* cited by examiner

SHIPPING SPECIFICATIONS

400

Cargo Weight
[ 401a ]

Cargo Type — 403
[ HAZMAT ▽ ]

Maximum cost
$ [ 409 ]

Dimensions
[ 401b ]

Origin
[ 411 ]

405 → Pick up date & time
[ 17 ] [ January ▽ ] [ 2010 ▽ ]
[ 9:30 ] [ AM ▽ ]

Destination
[ 413 ]

407 → Delivery date & time
[ 20 ] [ January ▽ ] [ 2010 ▽ ]
[ 9:30 ] [ AM ▽ ]

Route Options — 415a
☐ Maximize highways/freeways
☐ Shortest Route — 415b
☐ Fastest Route — 415c

Max driving time
[ 417 ] Hrs/day

[ clear ]   [ submit ]

FIG. 4

SYSTEM AND METHOD FOR COORDINATING TRANSPORT OF CARGO

BACKGROUND

Companies, organizations and other entities that wish to have goods, products or other types of shipping loads or cargo transported (i.e., "shippers") often seek out the lowest cost both in terms of transport fees and fueling costs. To obtain lower prices and costs, shipping entities frequently negotiate prices with one or more carriers. In most cases the carriers negotiate a "fuel surcharge" formula with the shipper. This fuel surcharge shifts some or all of the cost of fuel price increases to the shipper. The contracts that result from these negotiations typically do not cover all of the needs of a shipper. Excess requirements are typically handled through a "spot market" either through a broker or by using a load exchange service (load board). Current solutions provide a posting board for shippers to post loads/cargo that need to be transported and for carriers to bid for and accept posted transport jobs. While this increases the efficiency of finding a transport or carrier, the posting board does not account for the need to minimize fuel related transport costs. Oftentimes, a transporting entity such as a carrier or independent trucker sets their rates based on anticipated fuel costs. In the spot market the shipper has no direct control over fuel cost. The smaller carriers and independent contractors that provide much of the capacity in the spot market do not have the ability to negotiate optimum fuel prices as do the larger carriers that typically provide freight contracts to shippers. Truck stops that provide most of the fuel to the carriers providing these services have no visibility to the process and no access to the load boards.

SUMMARY

The following presents a simplified summary in order to provide a basic understanding of some aspects of the invention. The summary is not an extensive overview of the invention. It is neither intended to identify key or critical elements of the invention nor to delineate the scope of the invention. The following summary merely presents some concepts of the invention in a simplified form as a prelude to the description below.

Aspects described herein relate to systems, methods, apparatuses and computer-readable media for providing a marketplace system configured to solicit transport bids and fueling bids for a shipping or transport job. By using a bidding system, costs may be minimized or managed by asking fueling providers and carriers to compete with one another for a shipping job and to commit to a price up front. In one or more arrangements, carriers may bid for individual jobs or loads posted by a shipper while fuel providers may bid for fueling needs posted by a carrier. In one example, a carrier may win a bid to transport a load of products from Phoenix, Ariz. to Flint, Mich. The carrier may determine an amount of fuel needed and solicit bids from fuel providers (e.g., stations, companies, wholesalers, oil companies) for re-fueling a vehicle at an origin or destination of or along the transport route between Arizona and Michigan.

According to another aspect, the bids for fuel and transport may be based on an automatically generated route for transporting the shipping load. The route may be generated based on minimizing distance (e.g., shortest miles from origin to destination), maximizing speed (e.g., highest average speed limit/mile) and/or combinations thereof. The manner in which the route is automatically generated may be selected by a shipper, a carrier, both or may be predefined based on a default or by the route generation system. Alternatively or additionally, the system may allow a carrier or transporter to make bids for the different types of routes. For example, a carrier may bid one price for a first generated route (e.g., a shortest distance route) and another price for a second generated route (e.g., a fastest route). This may offer a shipper more options in terms of cost vs. delivery time. Additionally, use of multiple routes may provide a carrier with a sense of potential differences in fueling costs along those different routes.

According to yet another aspect, a fuel bidding system may automatically identify locations for refueling so that potential fuel providers are aware of the refueling locations when bidding to provide fuel. For example, the system may identify where a vehicle is projected to need fuel based on a fuel efficiency of a vehicle transporting the load, a capacity of the vehicle's fuel tank and a projected route. The locations may be at the origin (e.g., prior to or shortly after departure), at the destination (e.g., upon completion of the route or shortly before completion of the route) and/or along the transport route. The location may be identified by zipcode, an address, an area generated based on a specific address and a distance limitation from that address and the like. In some arrangements, a shipper may further pre-authorize fueling transactions and provide the carrier with pre-authorization codes. Different pre-authorization codes may be provided for each projected or planned fueling transaction. Alternatively, a single pre-authorization code may be provided for all fueling transactions during the transport. The pre-authorization code may be associated with a maximum cost, maximum amount of fuel, expiration date and the like.

According to still another aspect, a shipper may purchase his or her own fuel. The fuel may, in some arrangements, be delivered to fueling stations along a carrier route. Alternatively, the shipper may purchase fuel in bulk and obtain the fuel from any of one or more locations associated with the fuel provider/seller. For example, a shipper may accept bids for fuel from fuel wholesalers or oil companies rather than individual fuel stations. One or more fueling stations may be associated with (e.g., supplied by) the wholesalers or oil companies from which the shipper accepted the fuel bid. Accordingly, the shipper and the fuel provider may authorize refueling at the fueling stations up to the purchased bulk amount of fuel (e.g., rather than having to take physical possession of the purchased fuel and having the fuel dispensed in some manner). In such arrangements, the fueling stations where the purchased fuel is to be delivered and/or obtained may charge a dispensing fee. These fees may be charged directly to the shipper without involving the carrier.

According to yet another aspect, a shipper may post a transport job to a bidding forum. A carrier may bid on the transport job and be provided with current fuel bids for a refueling portion of the transport. The carrier may thus use this information to more accurately bid for the transport job. In some arrangements, the carrier may be charged with selecting the winning fuel bids or committing the prices or bids selected by the shipper.

BRIEF DESCRIPTION OF THE DRAWINGS

The present disclosure is illustrated by way of example and not limited in the accompanying figures in which like reference numerals indicate similar elements.

FIG. 4 illustrates an example shipping specification interface according to one or more aspects described herein.

DETAILED DESCRIPTION

In the following description of various illustrative embodiments, reference is made to the accompanying drawings, which form a part hereof, and in which is shown, by way of illustration, various embodiments in which the claimed subject matter may be practiced. It is to be understood that other embodiments may be utilized and structural and functional modifications may be made without departing from the scope of the present claimed subject matter.

Figure 1:
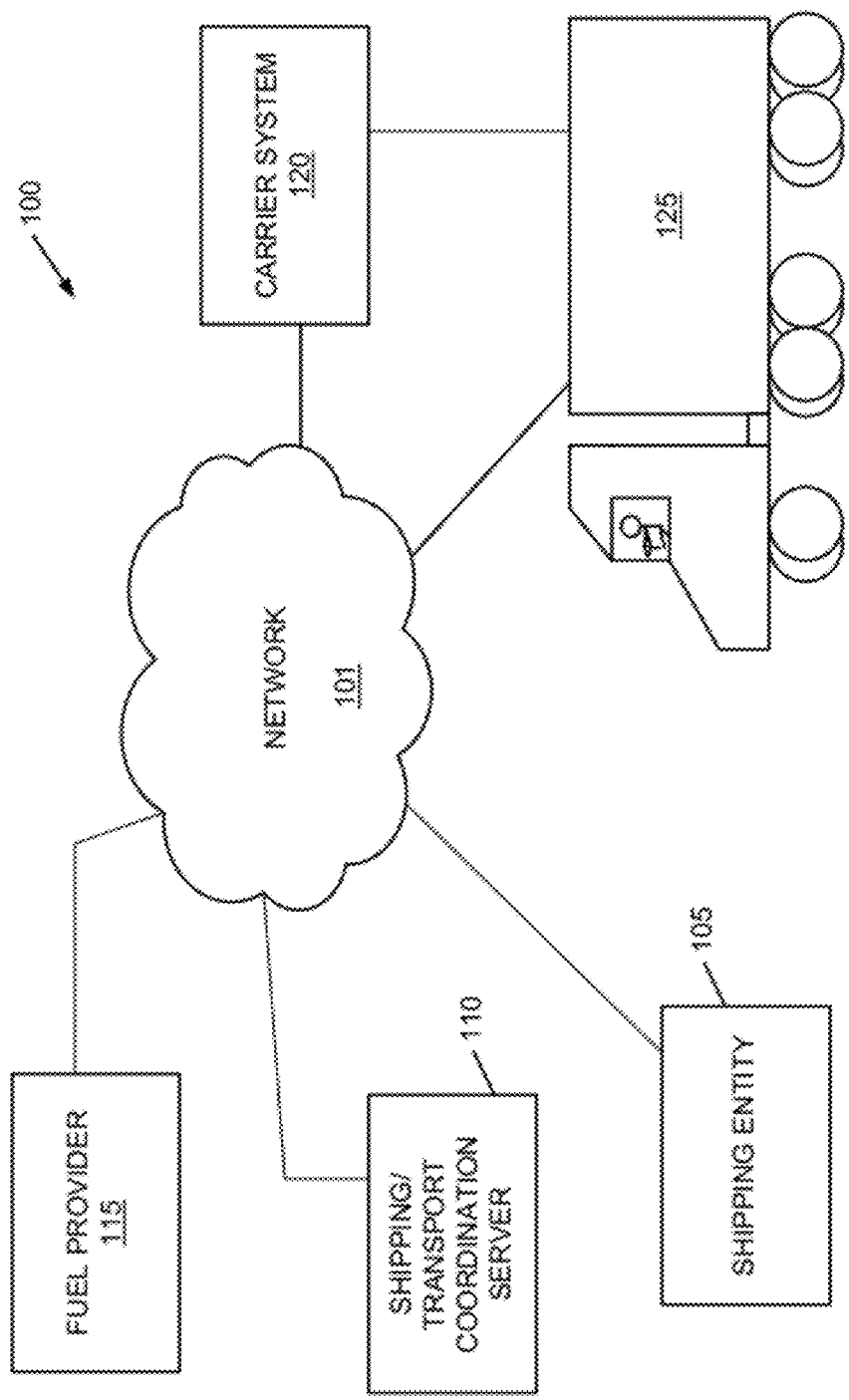
FIG. 1 illustrates an example of a suitable operating environment in which various aspects of the disclosure may be implemented.

FIG. 1 illustrates a network environment through which fuel providers and carriers may bid for various aspects of a transport job. In one example, shipping entity 105 may post a needed transport job to shipping/transport coordination server 110. A carrier may bid for the transport job. If the carrier wins the bid, the carrier may then determine fueling requirements and post such fueling needs (e.g., fueling transactions) to solicit bids from fuel providers. A bid may include a price or cost as well as non-monetary terms including timeliness, willingness to accept a penalty, fuel grade, payment forms accepted, type and/or age of equipment, services or goods available at a fueling station etc. Shipping/transport coordination server 110 may include a shipping marketplace and bidding system as well as a transport scheduling system. Accordingly, server 110 may receive job parameters (fuel or transport), post the transport or fuel jobs and solicit or allow bids on those posted jobs. Server 110 may be configured to automatically generate a route for the transport job based on a specified origin and destination and/or other transport requirements/parameters received from a carrier and/or shipping entity 105. Shipping entity 105, carriers (e.g., via carrier system 120) and fuel providers may communicate with server 110 through network 101. Network 101 may include short-range wireless networks, long-range wireless networks, local area networks, wired networks, cellular networks, satellite networks, cable and/or fiber optic networks and the like.

Fuel provider 115 may submit bids for fueling a particular transport job to server 110. Server 110 may relay these bids to carrier system 120 of a carrier responsible for the transport job. Fuel provider 115 may include fuel companies, specific fueling stations, fuel wholesalers and the like. Carrier system 120, on the other hand, may correspond to a single vehicle/driver, a company having a fleet of vehicles/drivers and the like. Data may also be transmitted through network 101 to each of systems and devices 105, 110, 115 and 120. For example, bids received by server 110 may be conveyed to shipping entity 105 or carrier system 120. In instances where carrier system 120 or carrier 125 bid for transport jobs posted by shipping entity 125 through server 110, such bids, notifications of a winning bid, agreement terms and other information may be transmitted between carriers 120 and 125 and shipping entity 125 through network 101. Server 110 may be configured to coordinate such communications to the extent such transmission are needed.

Figure 2:
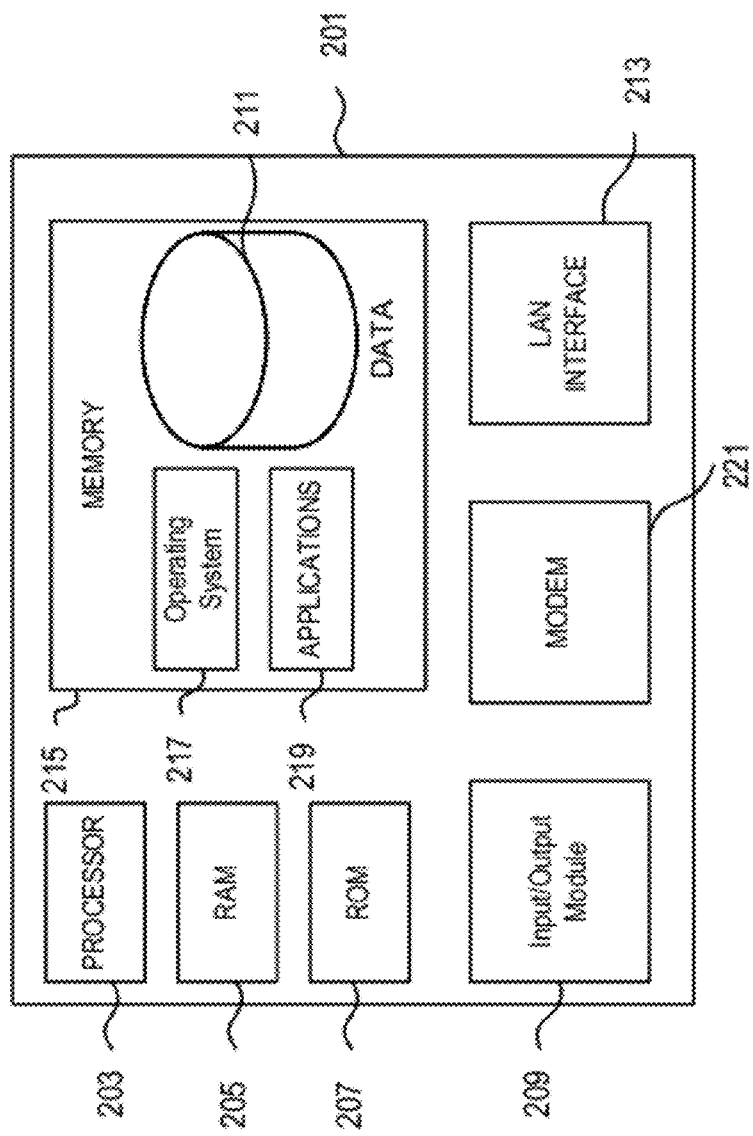
FIG. 2 illustrates a block diagram of a computing system that may be used to provide one or more aspects described herein.

FIG. 2 illustrates a block diagram of a computing device 201 that may operate as a variety of systems and devices including shipping entity system 105, server 110, fuel provider system 115, carrier system 120, vehicle 125 and/or a communication device (not shown) of a vehicle operator, all of FIG. 1, according to an illustrative embodiment of the disclosure. The computer system 201 may have a processor 203 for performing mathematical computations and controlling overall operation of the computing system 201 and its associated components, random access memory (RAM) 205, read-only memory (ROM) 207, input/output (I/O) module 209, and memory 215.

I/O 209 may include a microphone, mouse, biometric scanner or identifier, keypad, touch screen, scanner, optical reader, and/or stylus (or other input device(s)) through which a user of computer system 201 may provide input, and may also include one or more of a speaker for providing audio output and a video display device for providing textual, audiovisual and/or graphical output. Software (e.g., computer readable instructions) may be stored within memory 215 and/or other storage to provide instructions to processor 203 for enabling device 201 to perform various functions. For example, memory 215 may store software used by the computing system 201, such as an operating system 217, application programs 219, and an associated database 211. Alternatively, some or all of computing system 201 may be embodied in hardware or firmware (not shown).

Computing device 201 may also correspond to mobile communication devices and terminals (e.g., mobile phones, PDAs, notebooks, etc.) including various other components, such as a battery, speaker, and antennas (not shown). Additionally or alternatively, computing device 201 may be connected to one or more networks (e.g., network 101 of FIG. 1) through modem 221 or local area network (LAN) interface 213. In one or more examples, computing device 201 may have wired or wireless connections to one or more networks. In still other examples, computing device 201 may be installed as an in-cab communication terminal that communicates with other terminals and systems via Wi-Fi, satellite or cellular networks.

Figure 3:
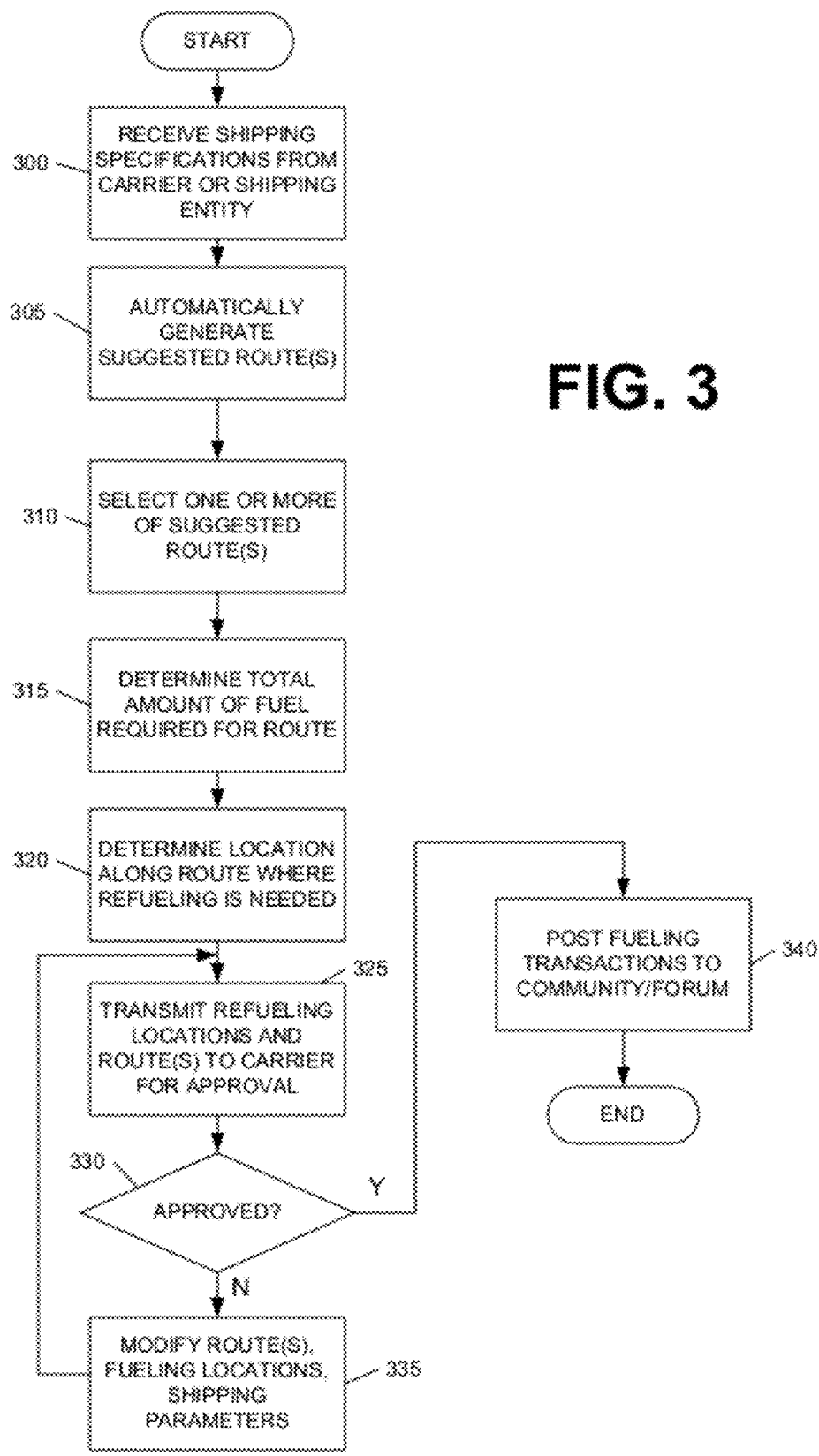
FIG. 3 is a flowchart illustrating a method for defining a transport job and automatically generating a transport job posting according to one or more aspects described herein.

FIG. 3 is a flowchart illustrating an example method for receiving shipping requirements for a load of cargo that is to be transported and automatically generating shipping parameters based thereon. For example, in step 300, a transport bidding system may receive shipping specifications from a carrier (e.g., for a transport job the carrier has won or accepted) or a shipping entity. The specifications may include a size (e.g., weight and/or physical dimensions) of a load, a type or contents of the load (e.g., type of goods, products, chemicals, hazardous materials, etc.), origin, destination, required delivery time including time allotted and required time of delivery, maximum acceptable cost, vehicle requirements and the like. Additionally or alternatively, the shipping specifications may also indicate a need for special licenses and/or permits for transporting various kinds of materials (e.g., hazardous materials, wide loads, etc.). In step 305, the transport bidding system may automatically generate one or more suggested routes based on the shipping specifications received in step 300. For example, the transport bidding system may determine a fastest route from the specified origin to the destination or a shortest route. The route generation algorithm may further account for road restrictions (e.g., some roads might not allow certain types of trucks or transport loads or loads of a certain amount of weight). In one particular example, a route may be generated using PC*MILER®. Routes for a carrier may also be generated based on other factors such as toll or non-toll. In step 310, one of the generated routes may be selected. For example, the generated routes may be transmitted to the carrier or a shipping entity for selection. Alternatively, the system may automatically select one of the routes or generate only a single route based on the shipping specifications. For instance, the shipping specifications may indicate a preference for speed over shortest distance.

In step 315, the system may subsequently determine a total amount of fuel required for transporting the cargo or load from the origin to the destination along the selected route. Since the amount of fuel required may vary from vehicle to vehicle, different amounts of required fuel may be determined for different vehicle types. In one or more arrangements, the amount of fuel required may be calculated based on historical records of fuel efficiency for the different types of vehicles, an advertised fuel efficiency, the weight of the cargo, total transport distance, expected terrain and the like. Additionally, in step 320, the system may further determine locations along the selected route where fueling is projected to be needed. The system, a carrier and/or a shipper may define a time or remaining amount of fuel when refueling will be required or should be performed. For example, the system may schedule refueling whenever the vehicle's fuel is projected to be at or below 5 gallons, 2 gallons, 1.5 gallons, 1 gallon, 4 gallons, etc. The location may be defined by a zipcode, a city, a county, an address and the like. The locations may be determined based on the projected fuel efficiency of the vehicle transporting the cargo. Again, if a vehicle and/or carrier has not yet been selected for transporting the cargo, multiple projected locations may be determined, one for each type of vehicle. In one particular example, if a type of transport vehicle has a fuel efficiency of 10 miles/gallon and a fuel tank capacity of 100 gallons, the system may identify a city, zipcode or other type of location identifier 980 miles after the origin of the transport route as a first refueling point. The 980 miles is calculated based on a 2 gallon tolerance (e.g., refuel when at or below 2 gallons) and multiplying 10 miles/gallon by 98 gallons. Additionally or alternatively, fueling locations may also be dictated based on the availability of fueling stations along the route. A system may determine whether fueling stations are available in a particular location (e.g., a zipcode area or an area defined by a mileage radius around a particular address) based on a database of fueling stations. Accordingly, if, in the above example, no fueling stations are located along the route 980 miles away from the origin, the next closest location having a fueling station may be selected. Selected fueling locations might also be required to have at least two fueling stations so that multiple bids are potentially received.

In some instances, a carrier vehicle may have a fuel capacity that is greater than or equal to the transport distance. In such cases, the carrier or shipper may solicit bids for a single fuel transaction. The location of the fuel transaction may correspond to an area around the transport origin, an area around the destination or an area in between. For example, the carrier vehicle may obtain the requisite amount of fuel at the origin, prior to or shortly after departure. In another example, the carrier vehicle might already have a full tank and thus, only require refueling upon reaching or shortly before reaching the destination.

In step 325, the determined routes and refueling locations may be transmitted to the carrier for approval. If approved, as determined in step 330, the refueling transactions (and parameters thereof) may be posted to an electronic bidding forum for solicitation of bids for the fueling transactions in step 340. The bidding forum may be accessed by individual fueling stations, oil companies, fuel station companies and the like. If the carrier does not approve, modifications may be made to the shipping specifications, generated routes and/or refueling locations in step 335. In one example, the carrier may specify particular roads to include in the route. In some arrangements, the process described above with respect to FIG. 3 may be provided for the shipper instead of the carrier. For example, the route and fuel bids may be transmitted to and reviewed by the shipper for acceptance and approval.

FIG. 4 illustrates an example shipping specification interface through which a shipping entity or carrier may define cargo, fueling and transport parameters for a transport job. For example, interface 400 includes cargo weight and dimension input fields 401, a special cargo type identification menu 403, pick-up time selection options 405, delivery time selection options 407, maximum acceptable cost field 409, origin address or zipcode field 411 and destination address or zipcode field 413. Interface 400 may also include a route parameters section where multiple route generation options 415 may be displayed and/or selected. For example, a carrier may select option 415a to maximize highways and freeways and/or option 415b to select a shortest route in terms of distance (e.g., fewest overall miles traveled). Option 415c may be selected to choose a fastest route and might only be selectable if option 415b is not selected (and vice versa). Additionally or alternatively, interface 400 may allow the shipping entity or carrier to specify a maximum amount of driving time per day using field 417. For example, if carrier or industry regulations prevent a driver from driving for more than 10 hours a day, such a requirement or limitation may be entered in field 417 and used when generating a route and scheduling refueling along the route. Interface 400 may be modified to include a variety of other options depending on the needs of the shipping entity and/or the carrier.

Figure 5:
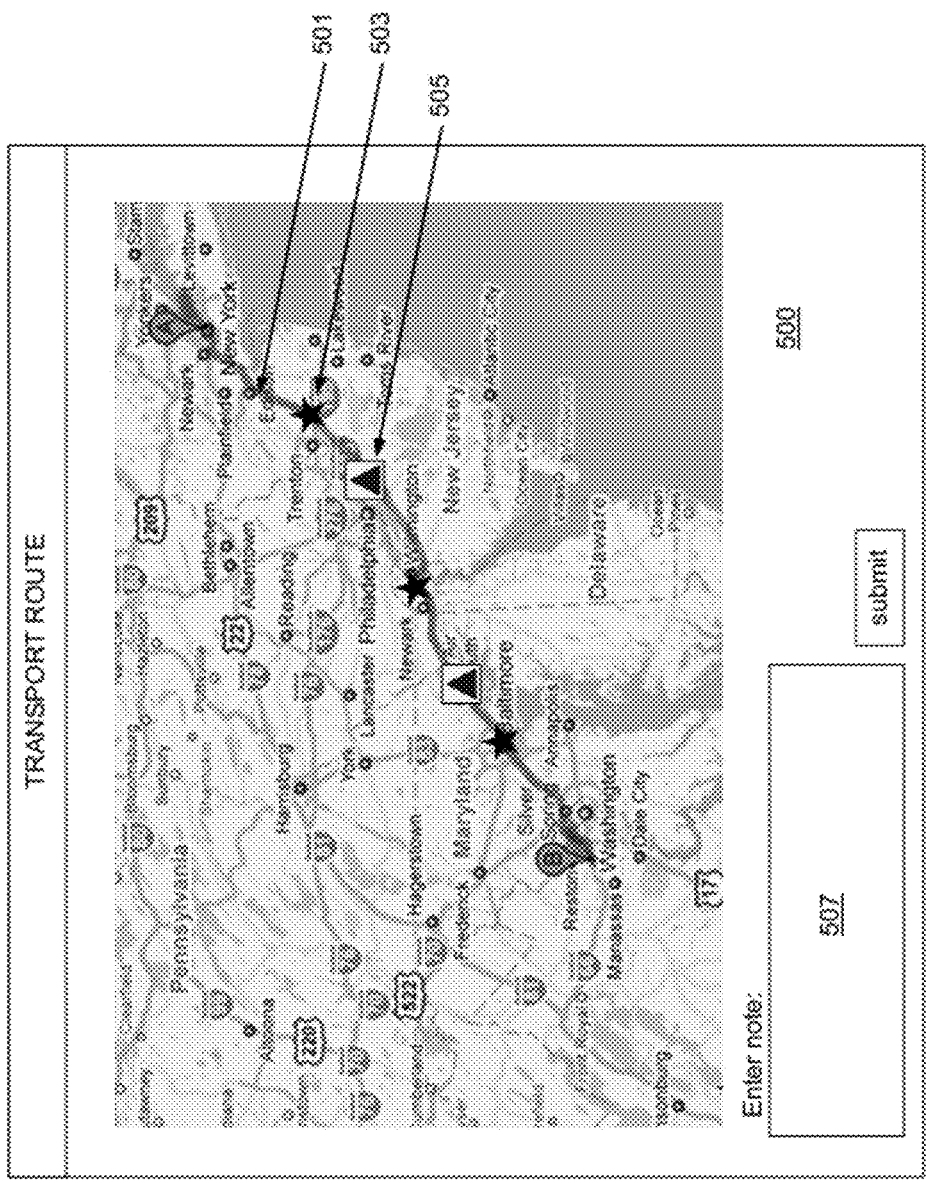
FIG. 5 illustrates an example transport route according to one or more aspects described herein.

FIG. 5 illustrates an example transport route map that includes indicators for projected refueling locations. Map 500 displays the proposed or generated route 501 in a different visual appearance than other roads and routes. In one example, map 500 may animate route 501 upon first displaying route 501. Additionally, map 500 includes indicators 503 for the projected refueling locations. Hovering over or otherwise interacting with indicators 503 may cause a pop-up window (not shown) to be displayed, showing additional details about that location including fueling locations in that location, food options, rest stops and the like. In one or more arrangements, the detailed information may include an average fuel cost in the area. Map 500 may include additional indicators 505 that correspond to mile markers or other predefined distance markers. In another example, indicators 505 may correspond to projected resting points. For example, if a driver is only allowed to drive 10 hours a day, the system may automatically identify truck stops where the driver may rest. Accordingly, these stops may be identified using indicators 505. Different types of indicators may be displayed using different colors, symbols, sizes, transparencies and the like. In one or more arrangements, a shipping entity may be allowed to add notes to map 500 using field 507. These notes may be transmitted along with the map and route to the bidding system, carriers and/or fuel providers. Additionally or alternatively, interacting with one or more points on the route 501 may display a projected status of the transport. For example, the projected status may include a day and time that the vehicle is projected to reach that point, a projected fuel level, a total fuel cost up to that point (e.g., all projected refueling costs prior to that location on the route) and the like.

Figure 6:
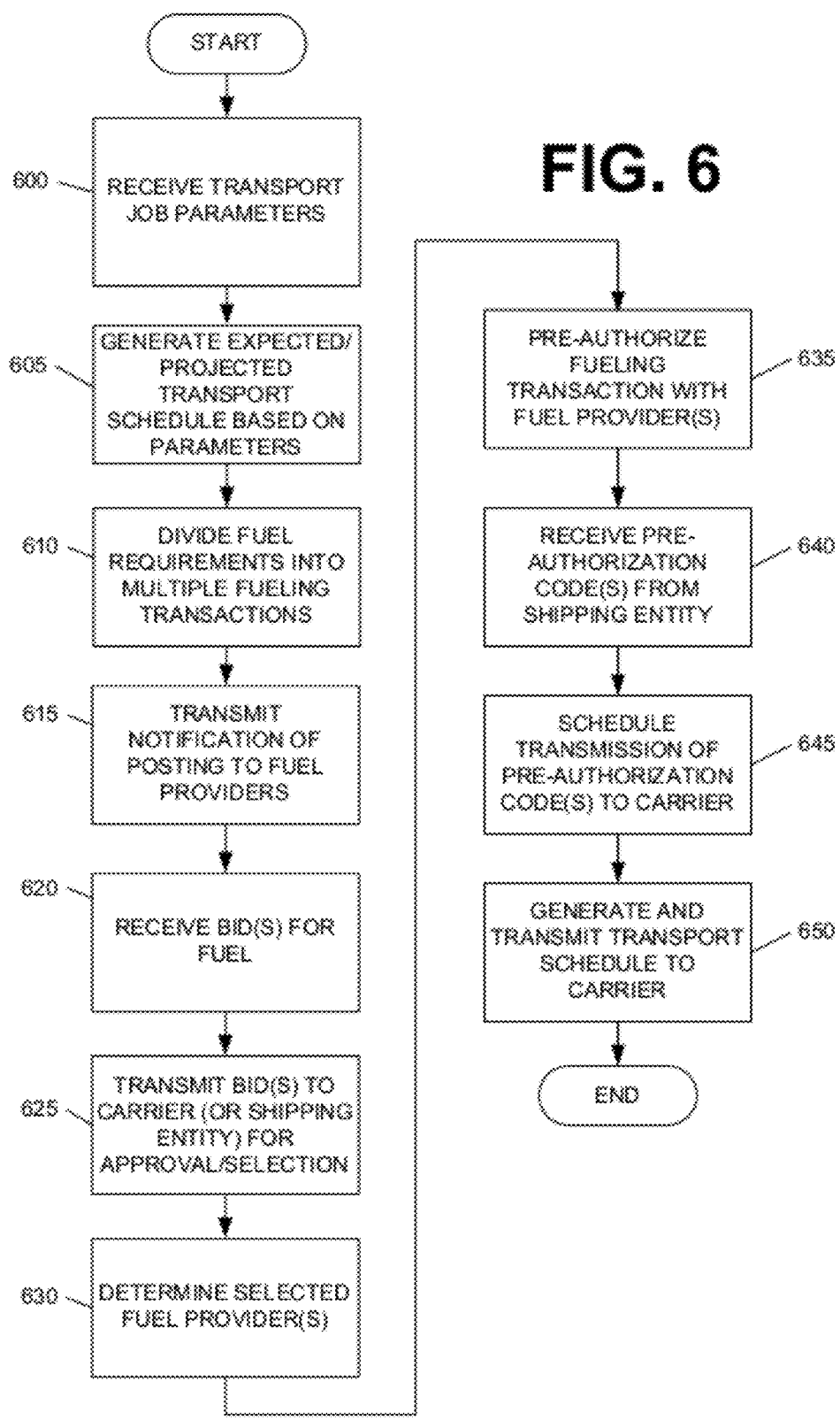
FIG. 6 is a flowchart illustrating an example method for soliciting bids and selecting one or more winning bids according to one or more aspects described herein.

FIG. 6 is a flowchart illustrating an example method for bidding for a transport job and accepting and initiating the transport job for a winning bidder. In step 600, the bidding system may receive transport job parameters from a carrier or a shipper. In step 605, the bidding system may generate an expected or projected transport schedule based on the parameters of the transport job. Additionally or alternatively, the bidding system may divide fueling requirements of the transport job into one or more discrete refueling transactions in step 610. For example, the fueling requirements of the transport job may specify that 500 gallons of fuel are required for the entire transport. However, those 500 gallons may be divided into 5 different refueling transactions of 100 gallons at different points along the route. Accordingly, the system may separate the 500 gallons into the 5-100 gallon transactions to allow fuel providers to bid for the 5 transactions individually rather than requiring bidding on the fuel requirements as a whole. Accordingly, the fuel requirements may be posted as 5 different biddable jobs rather than a single fuel job.

Once the fueling transactions for a transport job have been posted to a bidding forum or site, a notification may be transmitted to one or more fuel providers in step 615 to solicit bids. Notifications might only be provided if the fueling parameters specified by the carrier matches parameters of the fuel provider and/or if notifications are allowed by the fuel provider. Parameters may include location (state, geographic region such as east coast, west coast, mid-west, north, south, etc.), fuel type (e.g., diesel vs. unleaded), cost parameters (maximum price per gallon, maximum transport cost), required amount of fuel and the like. According to one or more arrangements, separate notifications may be transmitted for each of the individual refuel jobs.

In response to the notifications (or upon a carrier or fuel provider browsing the posted jobs), the system may receive one or more bids for the refueling transactions in step 620. Bids may be accepted for a predefined amount of time (e.g., 24 hours, 2 hours, 2 days, 5 days, 1 week, etc.). Bids may specify a price that the fuel provider would charge, other non-monetary or monetary incentives (e.g., free food, services, discounts for volume purchases, per diem allowance, etc.) and the like. In step 625, the bids may be transmitted to the carrier for evaluation and potential selection. Bids may be transmitted in real-time (e.g., as they come in), based on a predefined schedule (e.g., every hour, once-a-day) or upon expiration of the bidding period. Additionally or alternatively, only a lowest number (e.g., 1, 2, 5, 10) of bids may be transmitted to the carrier. Bids may include information such as price, fuel grade, services available at the fueling station (e.g., shower, food court, etc.) and the like.

In step 630, the system may determine which of the bidding fuel providers have been selected for the fueling transactions. In one or more arrangements, the system may automatically select the winning fuel provider based on specified criteria such as cost, fuel grade, services available, distance from planned route and the like. In other arrangements, the system may receive a selection of the winning bids from the carrier (e.g., the carrier may select the winners). Notification may also be sent to the entities submitting the winning bids. With respect to fueling, the system may pre-authorize transactions with the winning fuel providers using payment authorization information from the shipping entity in step 635. A pre-authorization code may then be issued by the shipping entity in step 640. Pre-authorization of fuel and other types of transactions and pre-authorization codes are described in further detail in U.S. application Ser. No. 11/678,110, entitled "SYSTEM AND METHOD FOR PROCESSING VEHICLE TRANSACTIONS," and filed Feb. 23, 2010. In step 645, transmission of the pre-authorization codes may be scheduled for transmission to the carrier (e.g., the vehicle and/or driver). For example, the pre-authorization codes may be scheduled for transmission a specified amount of time (e.g., 1 hour, 2 hours, 30 minutes) or distance (e.g., 5 miles, 10 miles) prior to arrival at a corresponding fueling station. Alternatively, some or all of the pre-authorization codes may be provided prior to or shortly after transport has begun.

In step 650, an expected or projected transport schedule may be generated based on the winning bidder's vehicle type and pick-up time and transmitted to the winning transport bid. The transport schedule may include checkpoints specifying an expected location of the vehicle at a specified time. The transport schedule may further specify refuel points and, in some arrangements, specific refuel locations or providers.

In some instances, the system might not post or solicit bids for fueling transactions until a winning carrier has been identified. This process may be used if refueling locations will vary greatly depending on varying vehicle types. Alternatively, the system may select refueling locations with a sufficient buffer amount of fuel to account for fuel efficiency differences between vehicles. For example, the system may select refueling locations based on the lowest fuel efficiency of all potential transport vehicles.

Figure 7:
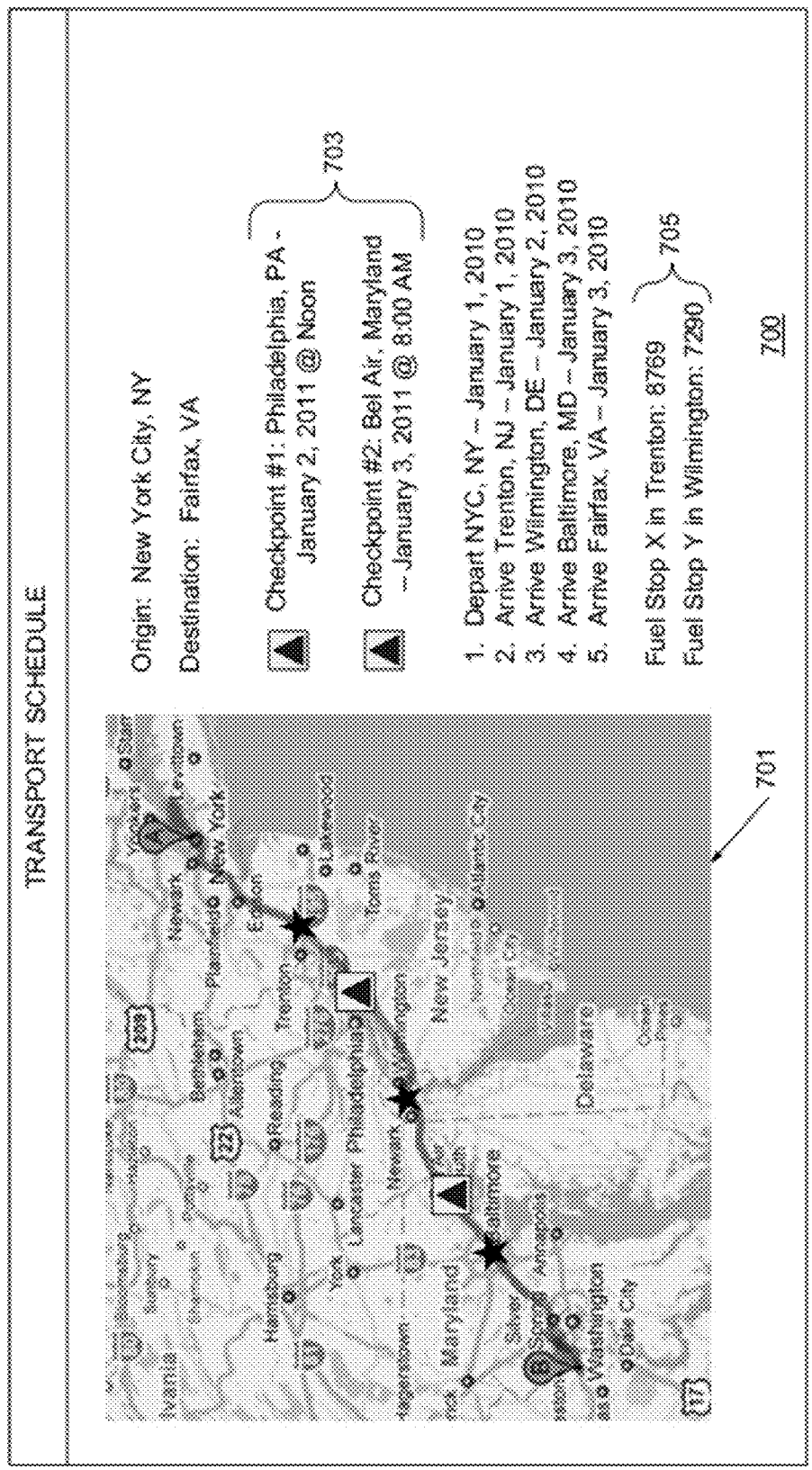
FIG. 7 illustrates an example transport schedule interface according to one or more aspects described herein.

FIG. 7 illustrates an example transport schedule that may be generated and sent to a carrier upon selecting a winning transport bid. Schedule 700 may include a map 701 that displays a route that the carrier is to take for transporting the cargo. Map 701 may include features, indicators and attributes similar to those described with respect to map 500 of FIG. 5. For example, map 701 may specify the fueling stations that the vehicle is to use during transport. Schedule 700 may further include a list 703 of checkpoints. The checkpoints 703 may identify a location along the route that the vehicle should reach at a particular time. In one or more arrangements, schedule 700 may further include pre-authorization codes 705 for initiating fuel transactions at the specified fueling locations. Accordingly, when a carrier refuels at a fueling station, the costs associated with the fueling transaction may be charged or billed directly to the shipping entity.

As noted herein, a shipping entity may purchase fuel for refueling vehicles transporting the shipping entity's cargo. The fuel may be purchased from fuel wholesalers or oil companies, for example. In such arrangements, the shipping entity may be required to arrange for the delivery of the fuel to the fueling stations. The shipping entity may, in one particular example, supply fuel to one or more fueling stations on a periodic or aperiodic basis. That way, when a vehicle transporting cargo for the shipping entity needs refueling, the shipping entity's fuel may be available at the station. The fueling station may allow such fueling practices in exchange for a fuel pumping fee. In another arrangement, the fuel may be purchased from fuel wholesalers or companies that supply fuel to or are otherwise associated with (e.g., own) fueling stations. Accordingly, the shipping entity may simply authorize a carrier to obtain fuel from one or more of the fueling stations. The amount of fuel obtained may then be deducted from the amount of fuel purchased from the fuel wholesaler or company. Accordingly, the shipping entity might not need to take physical possession or delivery of the purchased amount of fuel and to provide its own delivery of the fuel to refueling stations or to provide its own refueling systems.

Figure 8:
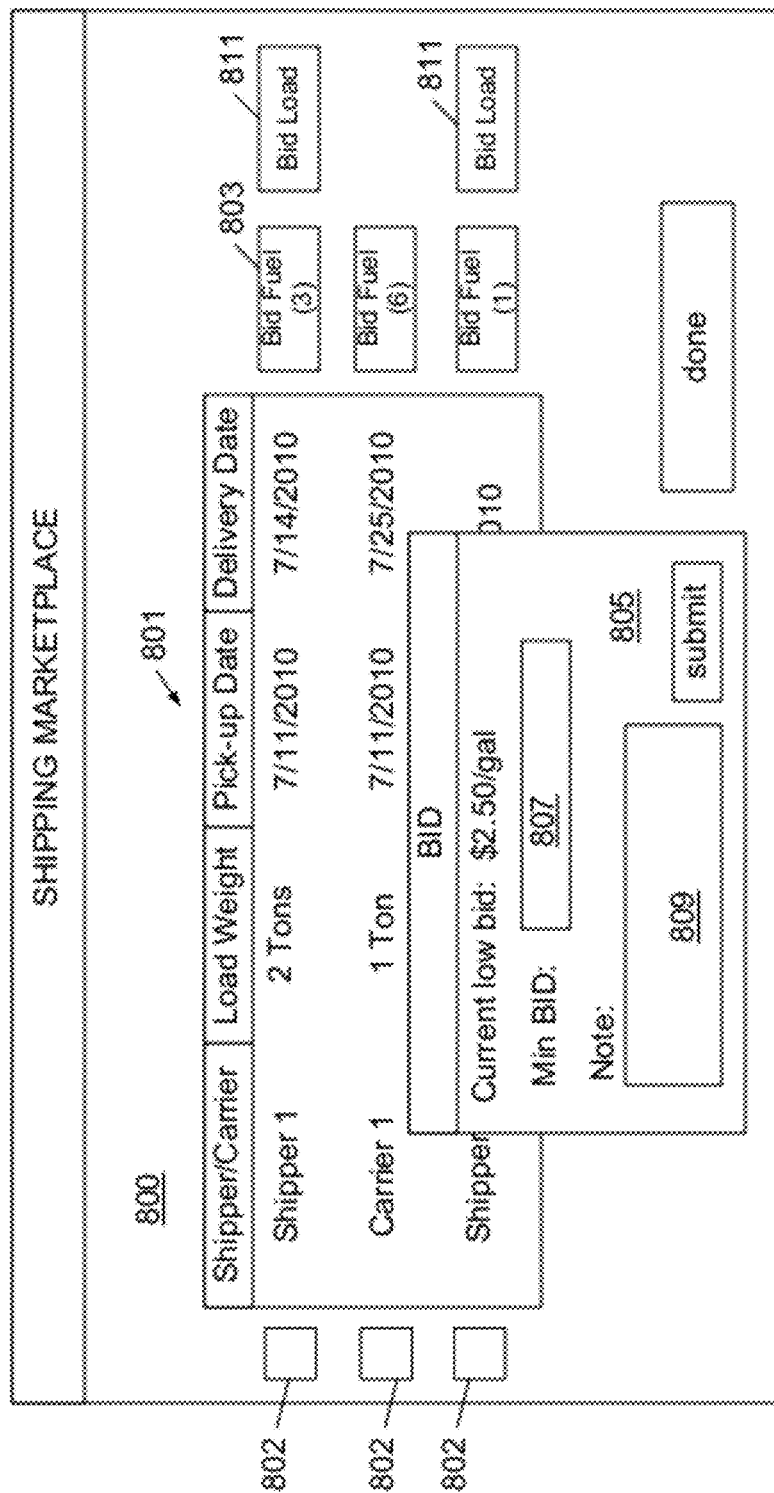
FIG. 8 illustrates an example bidding interface according to one or more aspects described herein.

FIG. 8 illustrates an example marketplace/bidding interface 800 that includes a listing of transport jobs 801. The listing 801 may include a description of the job, a type of material or product being shipped, an amount (e.g., weight) of material to be shipped, an origin and a destination. Some or all of this information may be provided upon selection of view details options such as options 802. Each entry in listing 801 may be associated with option 803 that allow a fuel provider to bid on the transport job (e.g., refuel needs of a carrier or shipper during transport). Fuel bidding option 803 may further be displayed with an indication of a number of fuel stops or transactions that are needed. Accordingly, upon selection of fuel bidding option 803, a sub-interface or pop-up window (not shown) may be displayed with the multiple, separately biddable fuel transactions. Each one of these fuel transactions may include its own bid option (not shown). In one example, upon selection of a fuel bidding option 803, a pop-up window 805 may be displayed that includes a price entry field 807. Price entry field 807 may represent the minimum price (e.g., price per gallon of fuel) the fuel provider is willing to bid. However, the initial bid by the fuel provider may be set to a predefined minimum amount below the current lowest bid. Bidding interface 805 further includes a note option 809 that allows a bidder to enter notes and/or messages to be transmitted to the carrier, shipping entity or other posting entity. In one particular example, the note option 809 may be used to specify non-financial incentives for selecting the bidder. Incentives may include free showers, meals and other services, discounts for using multiple fueling stations of that company and the like. Various other bidding and job viewing options may be included in interfaces 800 and 805.

In some arrangements, if the load or transport job is posted by a shipper, a load bidding option (e.g., for carrying the load) 811 may be provided. Option 811 allows carriers to bid for transporting the load. According to one or more aspects, the bid load option 811 might not be made available (e.g., grayed out or otherwise not selectable) until fuel bids have been received for each of the required fuel transactions, until at least one fuel bid (e.g., for at least one fuel transaction) has been received or until a specified number of bids have been received (e.g., for each transaction or across all transactions). Fuel bids may be accepted by the shipper or the carrier upon winning the transport bid. For example, the shipper may defer the selection of a winning fuel provider to the winning carrier. In a specific example, a carrier may bid for the load and be presented with a list of fuel bids for each of the fuel transactions that are projected to be needed during the transport job. The carrier may then submit a transport bid (inclusive or excluding fuel costs) based on the fuel bids received. If the carrier is the winning bid (as selected by the shipper or automatically determined), the carrier may be provided with the option or ability to select the winning fuel provider bids. In some instances, the ability to select the winning fuel bids may be specified as a criteria in the carrier's bid for transporting the load. According to one or more aspects, a cost bid by the carrier may represent a commitment to the currently lowest fuel bid for each transaction. Bidding for the load transport may operate similar to the process for bidding for a fuel transaction.

Figure 9:
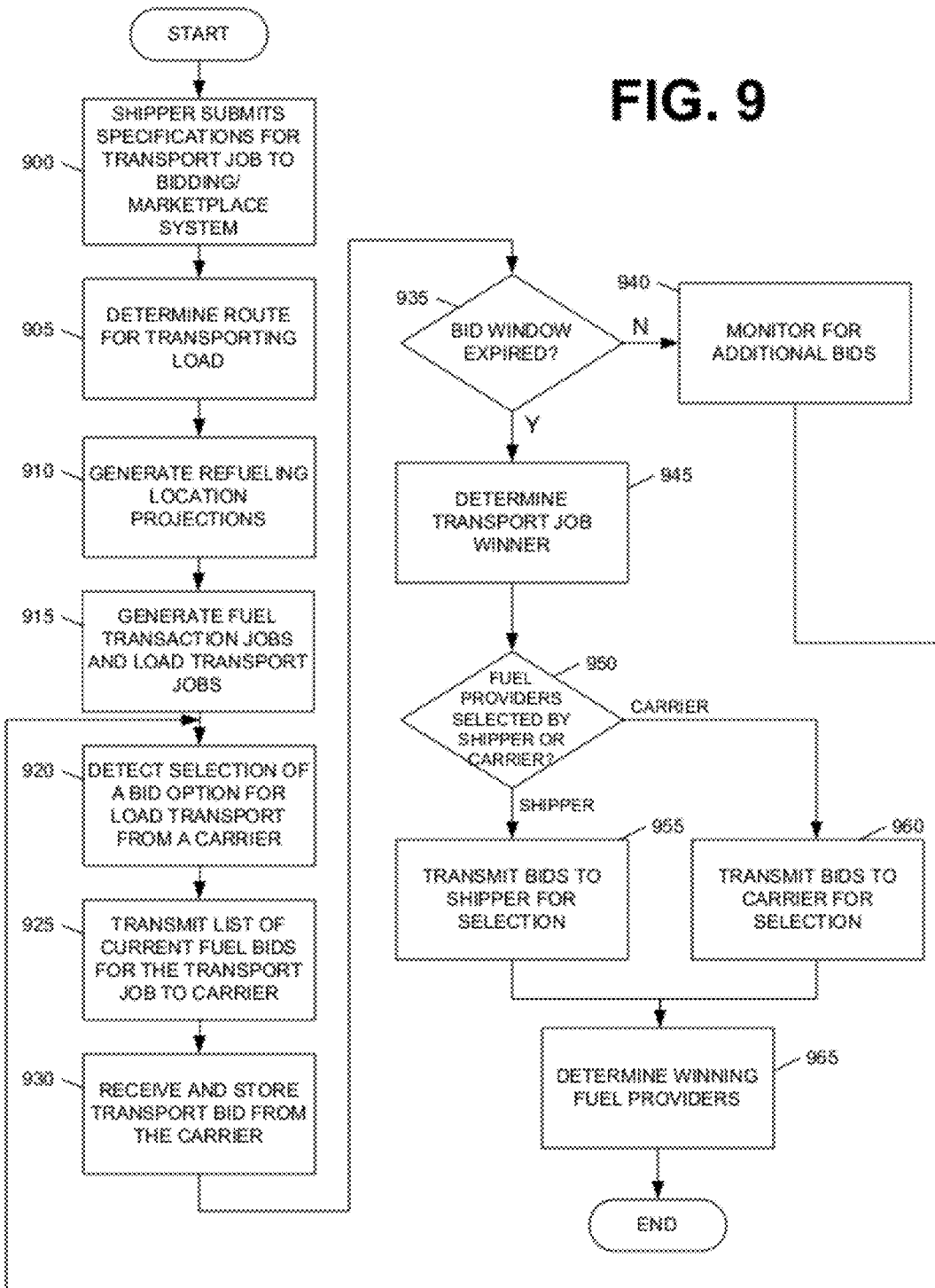
FIG. 9 is a flowchart illustrating an example method for soliciting bids for transporting a cargo load from one or more carriers according to one or more aspects described herein.

FIG. 9 illustrates an example method whereby a shipper may post a transport job to a marketplace/bidding system and receive bids. In step 900, the shipper may submit shipping specifications to the bidding system. In step 905, the bidding system may determine a route for transporting the load based on the specifications received from the shipper. In some instances, the specifications may include a preferred route, preferred type of roads (e.g., highway versus local roads), maximizing speed versus cost (e.g., highway with tolls versus slower roads without tolls) and the like. For example, the bidding system may determine a route using the processes described with respect to FIG. 3. In step 910, the bidding system may generate a projection of where refueling is needed based on fuel efficiency information, planned route, weight of cargo and the like. Once the refueling locations have been identified, the bidding system may generate fuel transactions jobs and load transport jobs for posting to a bidding forum in step 915. A fuel transaction job may be created for each projected refueling location/instance that is determined in step 910 while a single load transport job may be generated for soliciting bids for transporting the load by a carrier.

In step 920, the bidding system may detect selection of a bid option for load transport from a carrier. In response, the bidding system may transmit a list of current fuel bids for the transport job to the carrier in step 925. In step 930, the bidding system may receive and store a bid from the carrier. The bidding system may then determine whether a bidding window has expired for the transport job in step 935. For example, the shipper may specify that bids will only be accepted for a certain number of hours, days or until a certain time and/or date. If the bidding window has not expired, the bidding system may continue to monitor for additional bids (e.g., for both fuel transactions and transport) in step 940. If the window has expired, however, the bidding system may determine a transport job winner from the bidding carriers in step 945. Again, the winner may be selected by the shipper or automatically based on the lowest bid.

In step 950, the bidding system may further determine whether the fuel providers are to be selected by the shipper or the carrier. This specification may be made by the shipper when submitting the transport job for posting, based on a default, based on a bidding parameter submitted by the carrier and the like. If the fuel provider selections are to be made by the shipper, the bidding system may transmit the bids to the shipper for selection in step 955. If, on the other hand, the fuel providers are to be selected by the carrier, the bidding system may transmit the bids to the carrier in step 960. In either case, the bidding system may determine the winning fuel providers in step 965. In some instances, the bidding system may automatically select the winning fuel providers based on parameters specified by the shipper or the carrier (depending on which entity is to make the selection). The above process allows the carrier to submit a competitive and realistic bid by having up to date fuel bids for refueling the carrier's vehicle. In some scenarios, the bid submitted by a carrier may exclude fuel costs. Instead, the carrier may commit to paying the refueling bid(s)/costs selected by the shipper.

While the above methods and systems have been described herein with respect to fuel and oil, bidding may also be facilitated for other types of energy such as electricity. Accordingly, all-electric vehicles or hybrid vehicles may also use the bidding system to solicit bids for electricity costs.

The disclosure is operational with numerous other general purpose or special purpose computing system environments or configurations. Examples of well known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The disclosure may be described in the general context of computer-executable instructions, such as program modules, being executed by one or more computers and/or one or more processors associated with the computers. Generally, program modules include routines, programs, objects, components, data structures, etc. that perform particular tasks or implement particular abstract data types. Aspects of the disclosure may also be practiced in distributed computing environments where tasks are performed by remote processing devices that are linked through a communications network. In a distributed computing environment, program modules may be located in both local and remote computer storage media including memory storage devices. The methods and features recited herein may further be implemented through any number of computer readable media that are able to store computer readable instructions. Examples of computer readable media that may be used include RAM, ROM, EEPROM, flash memory or other memory technology, CD-ROM, DVD, or other optical disc storage, magnetic cassettes, magnetic tape, magnetic storage and the like.

While illustrative systems and methods described herein embodying various aspects are shown, it will be understood by those skilled in the art that the invention is not limited to these embodiments. Modifications may be made by those skilled in the art, particularly in light of the foregoing teachings. For example, each of the elements of the aforementioned embodiments may be utilized alone or in combination or sub-combination with the elements in the other embodiments. It will also be appreciated and understood that modifications may be made without departing from the true spirit and scope of the present invention. The description is thus to be regarded as illustrative instead of restrictive on the present invention.

What is claimed is:

1. A method comprising:
   receiving, by a fuel bidding system comprising a network communication interface and programmed to perform the method, information identifying fueling needs for a transport job to be performed by a carrier for a shipping entity, wherein the transport job includes transporting a load from an origin to a destination;
   determining, by the fuel bidding system, one or more locations along a shipping route at which fueling will be required based on at least one of: fuel efficiency of a transport vehicle and a weight of a cargo to be transported for the transport job;
   generating a job listing interface comprising a plurality of transport jobs, including the transport job to be performed by the carrier for the shipping entity, wherein the job listing interface includes a load bid option in a non-selectable state;
   determining, by the fuel bidding system, one or more fuel providers at the one or more locations, the one or more fuel providers including a first fuel provider and a second fuel provider;
   receiving, by the fuel bidding system, a first fuel bid comprising a first fuel cost from the first fuel provider;
   receiving, by the fuel bidding system, a second fuel bid comprising a second fuel cost from the second fuel provider, wherein the first fuel bid and the second fuel bid are received through the network communication interface;
   upon determining that at least one of the first fuel bid and the second fuel bid has been received for the transport job, activating a selectability of the load bid option from a non-selectable state to a selectable state in the job listing interface, wherein activating the selectability of the load bid option includes causing a device of the carrier to modify an appearance and an interactivity of the load bid option in the job listing interface, the carrier device being remote from the fuel bidding system;
   detecting, by the fuel bidding system, a selection of the load bid option by the device of the carrier through the network communication interface; and
   in response to detecting the selection of the load bid option, transmitting and presenting, by the fuel bidding system to the carrier through the network communication interface and the job listing interface, a list of current fuel bids received for the transport job, the list of current fuel bids including the first fuel bid and the second fuel bid.

2. The method of claim 1, further comprising determining a winning fuel provider, the determining including:
   receiving a selection of the first fuel provider or the second fuel provider from the carrier through a sub-interface of the job listing interface.

3. The method of claim 1, further comprising designating the shipping entity for paying fuel costs associated with the transport job.

4. The method of claim 1, wherein the information includes a shipping route and identification of one or more fueling points along the shipping route.

5. The method of claim 1, further comprising:
   determining whether each of the one or more fuel providers allows solicitation notifications based on stored fuel provider parameters; and
   transmitting a bid solicitation notification to each of the determined one or more fuel providers that allows solicitation notifications.

6. The method of claim 1, further comprising:
   transmitting a pre-authorization code for fueling the transport vehicle associated with the carrier to the carrier, wherein the pre-authorization code corresponds to a pre-authorized fuel transaction at the one or more fuel providers.

7. The method of claim 1, further comprising:
   determining, by the fuel bidding system, a projected fuel cost associated with transporting the load following the shipping route.

8. The method of claim 1, wherein projecting the one or more locations along the shipping route at which fueling will be required includes projecting a plurality of locations, and wherein the method further comprises:
   generating a fuel transaction job for each of the plurality of projected fueling locations; and posting the fuel transaction jobs to a bidding forum, wherein the first and second fuel bids are received through the bidding forum.

9. The method of claim 1, further comprising:
receiving a selection of the first fuel provider or the second fuel provider from the carrier;
in response to receiving the selection of the first fuel provider or the second fuel provider, pre-authorizing, with the selected first fuel provider or second fuel provider, a fuel transaction for a transport vehicle of the carrier; and
receiving a pre-authorization code in response to pre-authorizing the fuel transaction.

10. One or more non-transitory computer readable media storing computer readable instructions that, when executed, cause an apparatus to:
receive information identifying fueling needs for a transport job to be performed by a carrier for a shipping entity, wherein the transport job includes transporting a load from an origin to a destination;
determine one or more locations along a shipping route at which fueling will be required based on at least one of: fuel efficiency of a transport vehicle and a weight of a cargo to be transported for the transport job;
generate a job listing interface comprising a plurality of transport jobs, including the transport job to be performed by the carrier for the shipping entity, wherein the job listing interface includes a load bid option in a non-selectable state;
determine one or more fuel providers at the one or more locations, the one or more fuel providers including a first fuel provider and a second fuel provider;
receive a first fuel bid comprising a first fuel cost from the first fuel provider;
receive a second fuel bid comprising a second fuel cost from the second fuel provider;
upon determining that at least one of the first fuel bid and the second fuel bid has been received for the transport job, activating a selectability of the load bid option from a non-selectable state to a selectable state in the job listing interface, wherein activating the selectability of the load bid option includes causing a device of the carrier to modify an appearance and an interactivity of the load bid option in the job listing interface;
detect selection of the load bid option by the device of the carrier through a network communication interface, the carrier device being remote from the apparatus; and
in response to detecting the selection of the load bid option, transmit and present, to the carrier device through the job listing interface, a list of current fuel bids received for the transport job, the list of current fuel bids including the first fuel bid and the second fuel bid.

11. The one or more computer readable media of claim 10, wherein the computer readable instructions, when executed, further cause the apparatus to:
determine a projected fuel cost associated with transporting the load following the shipping route.

12. The one or more computer readable media of claim 10, wherein projecting the one or more locations along the shipping route at which fueling will be required includes projecting a plurality of locations, and
wherein, when the computer readable instructions are executed, the apparatus is further caused to:
generate a fuel transaction job for each of the plurality of projected fueling locations; and
post the fuel transaction jobs to a bidding forum, wherein the first and second fuel bids are received through the bidding forum.

13. One or more non-transitory computer readable media storing computer readable instructions that, when executed, cause an apparatus to:
receive information identifying fueling needs for a transport job for transporting cargo from an origin to a destination;
generate a job listing interface comprising a plurality of transport jobs, including the transport job for transporting cargo from the origin to the destination, wherein the job listing interface includes a load bid option in a non-selectable state;
receive a first fuel bid from a first fuel provider for the fueling needs of the transport job;
receive a second fuel bid from a second fuel provider for the fueling needs of the transport job;
upon determining that at least one of the first fuel bid and the second fuel bid has been received for the transport job, activating a selectability of the load bid option from a non-selectable state to a selectable state in the job listing interface, wherein activating the selectability of the load bid option includes causing a device of a carrier to modify an appearance and an interactivity of the load bid option in the job listing interface;
detect selection of the load bid option by the device of the carrier through a network communication interface, the carrier device being remote from the apparatus; and
in response to detecting the selection of the load bid option, transmit and present, to the carrier device through the network communication interface and the job listing interface, a list of current fuel bids received for the transport job, the list of current fuel bids including the first fuel bid and the second fuel bid, wherein transmitting and presenting the list of current fuel bids to the carrier device includes causing the carrier device to display the list of current fuel bids.

14. The method of claim 9, wherein the pre-authorization code is received from the shipping entity, and wherein the method further comprises:
storing the pre-authorization code;
monitoring a location of the transport vehicle of the carrier;
determining whether the transport vehicle is within a predefined distance or a predefined time of the selected first fuel provider or second fuel provider, the predefined distance or the predefined time defined for the pre-authorization code; and
in response to determining that the carrier is within the predefined distance or the predefined time of the selected first fuel provider or second fuel provider, transmitting the pre-authorization code to at least one of: the transport vehicle or a device of a driver of the transport vehicle.

15. The method of claim 9, wherein the pre-authorization code is received from the shipping entity, and wherein the method further comprises:
storing the pre-authorization code in association with a threshold notification time or distance;
determining a time at which the transport vehicle will reach the threshold notification time or distance from the selected first fuel provider or second fuel provider;
transmitting the pre-authorization code to at least one of: the transport vehicle or a device of a driver of the transport vehicle at the determined time.

* * * * *